US008186150B2

(12) United States Patent
Bourdon et al.

(10) Patent No.: US 8,186,150 B2
(45) Date of Patent: May 29, 2012

(54) EXHAUST TRACT FOR AN INTERNAL COMBUSTION ENGINE

(75) Inventors: Klaus Bourdon, Hettenshausen (DE); Hubert Graf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 430 days.

(21) Appl. No.: 12/563,454

(22) Filed: Sep. 21, 2009

(65) Prior Publication Data

US 2010/0071353 A1 Mar. 25, 2010

Related U.S. Application Data

(63) Continuation of application No. PCT/EP2008/001701, filed on Mar. 4, 2008.

(30) Foreign Application Priority Data

Mar. 21, 2007 (DE) .......................... 10 2007 013 500

(51) Int. Cl.
*F01N 3/00* (2006.01)

(52) U.S. Cl. ................ 60/287; 60/274; 60/288; 60/291; 60/292; 60/324

(58) Field of Classification Search ..................... 60/274, 60/287, 288, 290, 291, 292, 295, 324
See application file for complete search history.

(56) References Cited

U.S. PATENT DOCUMENTS

| | | | | |
|---|---|---|---|---|
| 4,685,291 A | * | 8/1987 | Ha | 60/286 |
| 4,875,336 A | * | 10/1989 | Hayashi et al. | 60/286 |
| 5,836,152 A | * | 11/1998 | Schatz | 60/274 |
| 6,178,743 B1 | * | 1/2001 | Hirota et al. | 60/277 |
| 6,779,339 B1 | * | 8/2004 | Laroo et al. | 60/297 |
| 7,263,823 B2 | * | 9/2007 | Andrews et al. | 60/288 |
| 7,640,728 B2 | * | 1/2010 | Yoshizaki et al. | 60/286 |
| 7,891,176 B2 | * | 2/2011 | Konstandopoulos | 60/297 |
| 2003/0115860 A1 | | 6/2003 | May et al. | |

FOREIGN PATENT DOCUMENTS

| | | |
|---|---|---|
| DE | 10 2004 027 593 A1 | 12/2005 |
| DE | 10 2005 017 863 A1 | 11/2006 |
| EP | 1 217 196 A2 | 6/2002 |

OTHER PUBLICATIONS

German Search Report dated Feb. 12, 2008 including partial English translation (Nine (9) pages).
International Search Report dated Jun. 23, 2008 including English translation (Four (4) pages).

* cited by examiner

*Primary Examiner* — Binh Q Tran
(74) *Attorney, Agent, or Firm* — Crowell & Moring LLP

(57) ABSTRACT

An exhaust tract for an internal combustion engine of a motor vehicle includes a first exhaust gas line, which conducts exhaust gases from the internal combustion engine to an exhaust-gas treatment device, and a second exhaust gas line, which forms a bypass line bypassing the exhaust gas treatment device. In order to ensure sufficient treatment of the exhaust gas even in the lean operating mode of an internal combustion engine, at least one first valve and one second valve are provided in series in the bypass line. An exhaust line is provided between the first valve and the second valve to reduce the pressure between the first and second valves. The pressure upstream of the second valve and the pressure downstream of the second valve, or the ambient pressure of the motor vehicle, are determined and negative pressure is applied to the exhaust line such that an exhaust gas flow via the second valve to the outside into the environment of the motor vehicle is prevented.

19 Claims, 1 Drawing Sheet

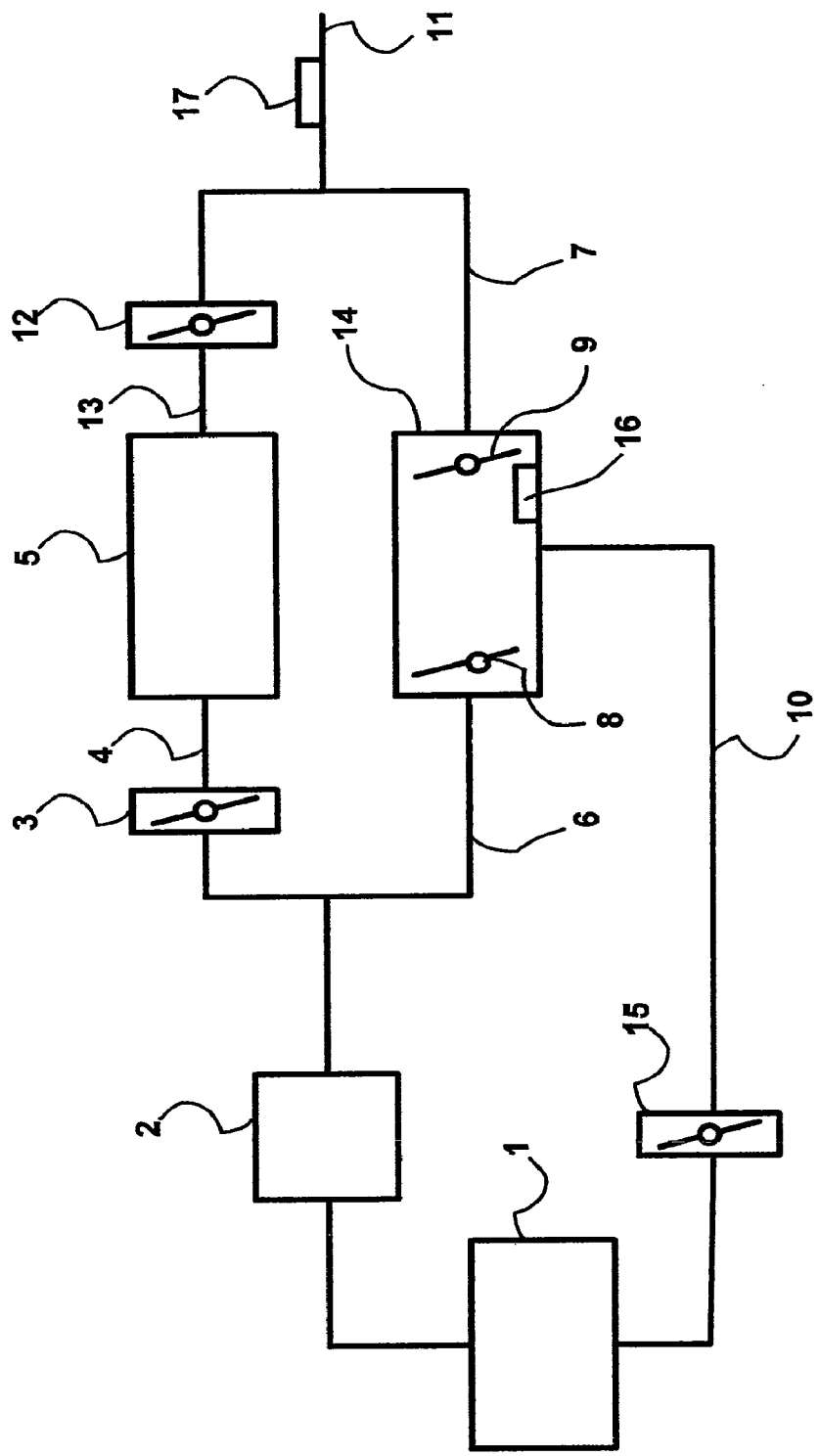

EXHAUST TRACT FOR AN INTERNAL COMBUSTION ENGINE

CROSS-REFERENCE TO RELATED APPLICATIONS

This application is a continuation of PCT International Application No. PCT/EP2008/001701, filed Mar. 4, 2008, which claims priority under 35 U.S.C. §119 to German Patent Application No. DE 10 2007 013 500.0, filed Mar. 21, 2007, the entire disclosures of which are herein expressly incorporated by reference.

BACKGROUND AND SUMMARY OF THE INVENTION

The invention relates to an exhaust tract for an internal combustion engine of a motor vehicle having a first exhaust gas line, which conducts exhaust gases from the internal combustion engine to an exhaust-gas treatment device, and a second exhaust gas line, which forms a bypass line bypassing the exhaust-gas treatment device.

The action of three-way catalytic converters known from the prior art is not sufficient during the lean operation mode of a spark-ignition internal combustion engine.

The object of the present invention is to provide an exhaust tract, in which a sufficient treatment of the exhaust gas is ensured even in the lean operating mode of an internal combustion engine.

This object is achieved by an exhaust tract wherein at least one first valve and one second valve are disposed in series in the bypass line. An exhaust line is provided between the first valve and the second valve to reduce the pressure between the first and second valves. The pressure upstream of the second valve and the pressure downstream of the second valve or the ambient pressure of the motor vehicle, are determined, and negative pressure is applied to the exhaust line such that an exhaust gas flow via the second valve to the outside into the environment of the motor vehicle is prevented. Advantageous embodiments of the invention are described herein.

Based on an exhaust tract of a motor vehicle including a first exhaust gas line, which conducts the exhaust gases from the internal combustion engine to an exhaust-gas treatment device, and a second exhaust gas line, which forms a bypass line bypassing the exhaust-gas treatment device, at least one first valve and one second valve are disposed in series in the bypass line. An exhaust line is provided between the first valve and the second valve to reduce the pressure between the first and second valves. The pressure upstream of the second valve and the pressure downstream of the second valve, or the ambient pressure of the motor vehicle, are determined, and negative pressure is applied to the exhaust line such that an exhaust gas flow via the second valve to the outside into the environment of the motor vehicle is prevented.

It can thus be ensured that only sufficiently treated exhaust gas leaves the motor vehicle. This is achieved, in particular, by the two valves disposed in series and the exhaust line provided between them for exhausting the exhaust gas present directly upstream of the second valve.

In one embodiment of the invention, the negative pressure in the exhaust line increases in the case of a rise in the differential pressure between the pressure upstream of the second valve and the pressure downstream of the second valve, or the ambient pressure. It is not always possible to ensure that valves or exhaust flaps disposed in the hot exhaust gas always close to a sufficient and/or same degree even after a long period of use. These negative basic conditions are confronted most effectively according to the invention by suitably adjusting the negative pressure or the degree of exhaustion by the exhaust line.

In one embodiment of the invention, the closing pressure of at least the second valve increases in the case of a rise in the differential pressure between the pressure upstream of the second valve and the pressure downstream of the second valve, or the ambient pressure. This supplementary or alternative measure can also prevent the discharge of insufficiently treated exhaust gas.

In one embodiment of the invention, when a predefined differential pressure between the pressure upstream of the second valve and the pressure downstream of the second valve, or the ambient pressure, is below a certain level (falls short), a fault message is generated and stored for diagnostic purposes. This fault can be indicated to the driver visually or acoustically so that repairs may be carried out in the short term. Furthermore, e.g., within the scope of a fault diagnosis at a regular vehicle service, the workshop receives an indication of the presence of the fault by way of the stored fault message, unless this fault has been repaired and the corresponding entry in the fault memory has already been deleted.

In one embodiment of the invention, in the case of a rise in the differential pressure between the pressure upstream of the second valve and the pressure downstream of the second valve, or the ambient pressure, the first valve is changed in the direction of the open position and the exhaust gas flow through the exhaust line is thus increased, and preferably the differential pressure is also reduced or largely held constant. This is a further measure which, alternately or additionally, can ensure the discharge of only sufficiently treated exhaust gas.

In an additional embodiment of the invention, the first valve and the second valve are actuated in a largely parallel manner in the case of a bypass of the exhaust-gas treatment device. This measure can reduce the mechanical or other expenditures incurred for ensuring the tightest possible closure of the valves and the exhaust flaps, e.g., by an arrangement of rods joining both valves for actuation.

In one embodiment of the invention, the exhaust line is connected to the internal combustion engine, and the intake of the internal combustion engine or a vacuum pump operated by the internal combustion engine generates a negative pressure in the exhaust line. The negative pressure required according to the invention can thus be created between the two valves with less expenditure.

In a preferred embodiment of the invention, the exhaust-gas treatment device is a nitrogen-oxide storage catalytic converter. This catalytic converter enables sufficient treatment of the exhaust gases of a gasoline engine in the lean operating mode if the exhaust-gas treatment by the conventional three-way catalytic converter is not sufficient.

In an additional preferred embodiment of the invention, the first valve and the second valve are closed so that the exhaust gases are largely conducted to the outside via the exhaust-gas treatment device, and a small part of the exhaust gases is returned via the exhaust line into the internal combustion engine when the internal combustion engine is operated in the lean operating mode.

In one embodiment of the invention, the first valve and the second valve are open and a third valve, provided upstream of the exhaust-gas treatment device, is closed when the internal combustion engine is operated outside the lean operation mode. The exhaust gases are then conducted to the outside via the bypass line. An additional valve is preferably disposed downstream of the exhaust-gas treatment device in order to prevent the harmful penetration of exhaust gases into the exhaust-gas treatment device via the outlet of the same.

In one embodiment of the invention, a fourth valve is provided in the exhaust line. The negative pressure in the exhaust line is preset with the aid of the position of the fourth valve.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic block diagram of an exhaust tract in accordance with an embodiment of the invention disposed on a spark-ignition internal combustion engine.

DETAILED DESCRIPTION OF THE DRAWING

The exhaust tract shown schematically in FIG. 1 is operated on a gasoline engine 1. The exhaust tract includes a three-way catalytic converter 2, a valve 3, the first part of a first exhaust gas line 4, an exhaust-gas treatment device 5, the second part of the first exhaust gas line 13, a valve 12, the first part of a second exhaust gas line 6, a shutoff device 14, the second part of the second exhaust gas line 7, an exhaust line 10 and a valve 15. The exhaust gases leave the vehicle (not shown) via the valve 12 and, in doing so, pass a pressure sensor 17, which measures the level of air pressure. The shutoff device 14 includes two serially disposed valves 8 and 9. Between the valves 8 and 9, the exhaust line 10 and a first pressure sensor 16 are provided on the shutoff device 14. The exhaust-gas treatment device 5 is a nitrogen-oxide storage catalytic converter in this embodiment.

During the lean operation mode of the gasoline engine 1, that is to say, at a low engine load, the valve 3 is open so that the exhaust gases discharged from the gasoline engine 1 are supplied to the exhaust-gas treatment device 5. The valve 12 is open so that the exhaust gases discharged from the exhaust-gas treatment device 5 leave the vehicle.

The bypass for the exhaust-gas treatment device 5, which bypass is formed of the first part 6 of the second exhaust gas line, the shutoff device 14, and the second part 7 of the second exhaust gas line, is closed, that is to say, the two valves 8 and 9 are in their closed position. Exhaust gas that possibly enters via an insufficiently closed valve 8 into the space between the valves 8, 9 is exhausted from the gasoline engine via the exhaust gas line 10 and an open valve 15 and supplied again to the combustion process of the engine 1.

By use of the pressure sensors 16 and 17, a differential pressure between the interior of the shutoff device 14, i.e., upstream of the valve 9, and the air pressure prevailing outside the vehicle is determined. An electrical control system (not shown) provided in the vehicle, in particular a corresponding control unit, is electrically connected with the two pressure sensors 16 and 17 and determines the differential pressure. If the pressure at the pressure sensor 16 approaches the air pressure beyond a predefined pressure difference, the electrical control system controls the valve 15 in such a way that the amount of gas exhausted from the engine 1 is increased and the predefined pressure difference is adjusted again. Due to the differential pressure and the negative pressure in the shutoff device 14, the exhaust gas is prevented from passing the valve 9 and being discharged from the vehicle. This also holds true when the valve 8 is not completely closed. If the pressure difference falls below a predefined threshold, that is to say, there exists the risk of the exhaust gas passing the valve 9 since there is no more negative pressure, this risk is detected by the electrical control system, a fault message is generated for the driver and the fault message is stored for later diagnostic purposes as an indication of the necessity of replacing the shutoff device 14.

During normal operation of the engine 1, in particular in the case of normal to high engine load, the three-way catalytic converter 2 filters the exhaust gases to a sufficient degree. In order to prevent any damage caused to the nitrogen-oxide storage catalytic converter 5 by the very hot exhaust gas entering into the same, particularly during full-load operation of the engine 1, the valves 3 and 12 are closed outside the lean operation mode of the engine. The valves 8 and 9 are completely open and the exhaust gas exclusively passes through the bypass line, which conducts the gas around the nitrogen-oxide storage catalytic converter 5 into the atmosphere. Thus, no exhaust gas can enter into the nitrogen-oxide storage catalytic converter 5.

TABLE OF REFERENCE SYMBOLS

1 Gasoline engine
2 Three-way catalytic converter
3 Valve
4 First part of a first exhaust gas line
5 Exhaust-gas treatment device
6 First part of the second exhaust gas line
7 Second part of the second exhaust gas line
8 Valve
9 Valve
10 Exhaust line
11 Ambient pressure
12 Valve
13 Second part of the first exhaust gas line
14 Shutoff device
15 Valve
16 First pressure sensor
17 Second pressure sensor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust tract for an internal combustion engine of a motor vehicle, comprising:
an exhaust-gas treatment device;
a first exhaust gas line, which conducts exhaust gases from the internal combustion engine to the exhaust-gas treatment device;
a second exhaust gas line, which is configured as a bypass line that bypasses the exhaust-gas treatment device;
a first valve and a second valve disposed in series in the bypass line;
an exhaust line provided between the first valve and the second valve in order to reduce a pressure between the first valve and the second valve; and
wherein pressure upstream of the second valve in a flow direction and pressure downstream of the second valve or an ambient pressure of the motor vehicle, are determined, and a negative pressure is applied to the exhaust line such that exhaust gas flow via the second valve to outside into an environment of the motor vehicle is prevented.

2. The exhaust tract according to claim 1, wherein the negative pressure in the exhaust line increases in an event of a rise in a differential pressure between the pressure upstream of the second valve in a flow direction and the pressure downstream of the second valve or the ambient pressure.

3. The exhaust tract according to claim 2, wherein a closing pressure of the second valve increases in the event of a rise in the differential pressure between the pressure upstream of the second valve and the pressure downstream of the second valve or the ambient pressure.

4. The exhaust tract according to claim 1, wherein when the differential pressure between the pressure upstream of the second valve and the pressure downstream of the second valve or the ambient pressure falls below a predefined differential pressure, a fault message is generated and stored for diagnostic purposes.

5. The exhaust tract according to claim 2, wherein in the event of a rise in the differential pressure, the first valve is moved in a direction of an open position and the exhaust gas flow through the exhaust line increases.

6. The exhaust tract according to claim 5, wherein when the first valve is moved in the direction of the open position, the differential pressure is largely held constant or reduced.

7. The exhaust gas according to claim 1, wherein the first valve and the second valve are actuated substantially in parallel in bypassing the exhaust-gas treatment device.

8. The exhaust tract according to claim 1, wherein the exhaust line is coupled to the internal combustion engine, an intake of the internal combustion engine or a vacuum pump operated by the internal combustion engine generating a negative pressure in the exhaust line.

9. The exhaust tract according to claim 1, wherein the exhaust-gas treatment device is a nitrogen-oxide storage catalytic converter.

10. The exhaust tract according to claim 1, wherein the first valve and the second valve are closed to conduct the exhaust gases to the outside via the exhaust-gas treatment device, and wherein a small portion of the exhaust gases return via the exhaust line into the internal combustion engine when operated in a lean operating mode.

11. The exhaust tract according to claim 10, further comprising a third valve arranged upstream of the exhaust-gas treatment device; and
wherein the first valve and the second are open and the third valve is closed when the internal combustion engine is operated outside of the lean operation mode, the exhaust gases being conducted to the outside via the bypass line.

12. The exhaust tract according to claim 11, further comprising a fourth valve provided in the exhaust line, the negative pressure in the exhaust line being preset with the aid of a position of the fourth valve.

13. A method of operating an exhaust tract for an internal combustion engine of a motor vehicle having a first exhaust gas line, which conducts exhaust gas from the internal combustion engine to an exhaust-gas treatment device, and a second exhaust gas line, which is configured as a bypass line that bypasses the exhaust-gas treatment device, the method comprising the acts of:
determining a pressure between a first valve and a second valve disposed in series in the bypass line;
determining one of a pressure downstream of the second valve or an ambient pressure of the motor vehicle; and
applying a negative pressure to an exhaust line provided between the first valve and the second valve, whereby an exhaust gas flow via the second valve to an outside into an environment of the motor vehicle is prevented.

14. The method according to claim 13, wherein the negative pressure in the exhaust line increases in an event of a rise in a differential pressure between the pressure between the first valve and the second valve and said one of the pressure downstream of the second valve and the ambient pressure.

15. The method according to claim 14, further comprising the act of increasing a closing pressure of the second valve in the event of the rise in the differential pressure.

16. The method according to claim 14, further comprising the act of generating a fault message when the differential pressure falls below a predefined differential pressure.

17. The method according to claim 13, further comprising the act of bringing the first valve in a direction of an open position in the event of a rise in the differential pressure, whereby exhaust gas flow through the exhaust line is increased.

18. The method according to claim 13, further comprising the act of actuating the first valve and the second valve in a parallel manner when bypassing the exhaust-gas treatment device.

19. The method according to claim 13, further comprising the act of generating the negative pressure in the exhaust line, which is connected to the internal combustion engine, via an intake of the internal combustion engine or a vacuum pump operated by the internal combustion engine.

* * * * *